United States Patent
Otoshi et al.

(10) Patent No.: US 7,738,064 B2
(45) Date of Patent: Jun. 15, 2010

(54) RETARDATION PLATE AND ITS MANUFACTURING METHOD, CIRCULARLY POLARIZING PLATE AND 1/2 WAVE PLATE USING SAME, AND A REFLECTIVE LIQUID CRYSTAL DISPLAY

(75) Inventors: Masaaki Otoshi, Shizuoka (JP); Takanori Sato, Shizuoka (JP); Tadashi Ueda, Shizuoka (JP); Fumitaka Terai, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 663 days.

(21) Appl. No.: 11/627,722

(22) Filed: Jan. 26, 2007

(65) Prior Publication Data

US 2007/0267127 A1 Nov. 22, 2007

Related U.S. Application Data

(62) Division of application No. 10/650,824, filed on Aug. 29, 2003, now abandoned.

(30) Foreign Application Priority Data

Aug. 30, 2002 (JP) .............................. 2002-254981

(51) Int. Cl.
- *G02F 1/1335* (2006.01)
- *B29D 11/00* (2006.01)
- *B29D 7/01* (2006.01)
- *B29C 55/00* (2006.01)

(52) U.S. Cl. .................. 349/119; 349/117; 349/187; 264/1.31; 264/1.34; 264/290.2

(58) Field of Classification Search ............. 349/119, 349/117, 187, 1.31, 1.34, 290.2
See application file for complete search history.

(56) References Cited

U.S. PATENT DOCUMENTS 5,574,593 A 11/1996 Wakita et al.
(Continued)

FOREIGN PATENT DOCUMENTS

JP 05-027118 2/1993
(Continued)

OTHER PUBLICATIONS

Machine translation of JP 10-239518 A, Sep. 1998.

*Primary Examiner*—Michael H Caley
(74) *Attorney, Agent, or Firm*—Sughrue Mion, PLLC

(57) ABSTRACT

A method is provided for manufacturing a wide band retardation plate which gives uniform phase difference characteristics to incident light over the whole visible wavelength region, and which, as it permits selection of raw materials regardless of whether they have a positive or negative intrinsic double refraction value, allows a wide selection of raw materials. For this purpose, the method comprises a machine direction-stretched film-forming step for transporting and stretching in an identical direction to the transport direction, a Material A of two or more materials having different positive intrinsic double refraction values to form a machine direction-stretched film, a transverse direction-stretched film-forming step for transporting and stretching in a perpendicular direction to the transport direction, a Material B of the aforesaid two or more materials to form a transverse direction-stretched film, and a lamination step for laminating the machine direction-stretched film and the transverse direction-stretched film.

8 Claims, 3 Drawing Sheets

U.S. PATENT DOCUMENTS

| | | | |
|---|---|---|---|
| 6,034,755 A * | 3/2000 | Watanabe | 349/118 |
| 6,400,433 B1 | 6/2002 | Arakawa | |
| 6,476,893 B1 | 11/2002 | Sasaki et al. | |
| 6,812,983 B2 | 11/2004 | Arakawa | |
| 2002/0005925 A1* | 1/2002 | Arakawa | 349/117 |
| 2002/0060762 A1 | 5/2002 | Arakawa | |
| 2003/0016446 A1 | 1/2003 | Yano et al. | |

FOREIGN PATENT DOCUMENTS

| | | |
|---|---|---|
| JP | 10-090521 | 4/1998 |
| JP | 10239518 A | 9/1998 |
| JP | 2000-111732 A | 4/2000 |
| JP | 2002-040258 | 2/2002 |
| JP | 2002-072201 A | 3/2002 |
| JP | 2002-131543 A | 5/2002 |

* cited by examiner

RETARDATION PLATE AND ITS MANUFACTURING METHOD, CIRCULARLY POLARIZING PLATE AND 1/2 WAVE PLATE USING SAME, AND A REFLECTIVE LIQUID CRYSTAL DISPLAY

This is a divisional of application Ser. No. 10/650,824 filed Aug. 29, 2003 now abandoned. The entire disclosure of the prior application, application Ser. No. 10/650,824, is hereby incorporated by reference.

BACKGROUND OF THE INVENTION

1. Field of the Invention

The present invention relates to a retardation plate and its manufacturing method, a circularly polarizing plate and 1/2 wave plate using same, and a reflective liquid crystal display which can be used in various fields such as personal computers, AV devices, portable information and telecommunications devices, games and simulation devices, and a vehicle-mounted navigation system.

2. Description of the Related Art

1/4 wave plates whose retardation (Re) is 1/4 of wavelength are used for various applications, such as reflective liquid crystal displays, optical disk pickups and anti-fogging films. On the other hand, 1/2 wave plates whose retardation (Re) is 1/2 of wavelength also have various uses such as in LCD projectors.

In these applications, it is desired that 1/4 wave plates and 1/2 wave plates manifest their full function with respect to incident light in all visible wavelength regions. In this regard, examples of wide band retardation plates which can fully demonstrate their functions with respect to incident light in the visible wavelength region and formed by laminating two sheets of polymer film having mutually different optical anisotropy may be mentioned (e.g., Japanese Patent Application Laid-Open UP-A) No. 05-27118, JP-A No. 05-100114, JP-A No. 10-68816 and JP-A No. 10-90521).

However, in prior art laminated type retardation plates, two types of chips had to be formed by cutting a birefringence film stretched in one direction, in directions subtending mutually different angles with respect to the stretching direction, these chips then being stuck together by an adhesive material and laminated. Moreover, when the two chips were stuck together, the coating of the adhesive material, cutting and sticking led to cost increases while decreased performance due to angular offset when the chips were stuck together could not be disregarded, hence improvements were desired.

SUMMARY OF THE INVENTION

It is therefore an object of the present invention to provide a wide band retardation plate, in particular a wide band 1/4 wave plate, wide band 1/2 wave plate and wide band circularly polarizing plate, which can be efficiently manufactured continuously at low cost by a simple process, which can be continuously wound to permit easy storage, and which gives uniform phase difference characteristics to incident light over the whole visible wavelength region, and to provide a reflective liquid crystal display having improved brightness using this retardation plate.

It is a further object of the present invention to provide a method of manufacturing a wide band retardation plate which gives uniform phase difference characteristics to incident light over the whole visible wavelength region efficiently, continuously and at low cost by a simple process, and wherein, as raw materials having positive or negative intrinsic double refraction values can be selected, permits a large selection of raw materials.

The retardation plate of the present invention is a laminate of two or more materials having different intrinsic double refraction values, wherein, when the values of the retardation (Re) at wavelengths of 450 nm, 550 nm and 650 nm respectively are Re(450), Re(550), and Re(650), $Re(450)<Re(550)<Re(650)$. As a result, a wide band 1/4 wave plate, wide band 1/2 wave plate and wide band circularly polarizing plate with uniform phase difference characteristics to incident light over the whole visible wavelength region, and a high quality retardation plate which may be used for a reflective liquid crystal display having improved brightness, can be obtained.

The retardation plate of the present invention is manufactured by one of the following aspects. The first aspect comprises a machine direction-stretched film-forming step wherein a machine direction-stretched film is formed by transporting, and stretching in an identical direction to the transport direction, a material A of two or more materials having different positive intrinsic double refraction values, a transverse direction-stretched film-forming step wherein a transverse direction-stretched film is formed by transporting, and stretching in a perpendicular direction to the transport direction, a material B of the two or more materials, and a lamination step wherein the machine direction-stretched film and transverse direction-stretched film are laminated. The second aspect comprises a machine direction-stretched film-forming step wherein a machine direction-stretched film is formed by transporting, and stretching in an identical direction to the transport direction, a material C of two or more materials having different negative intrinsic double refraction values, a transverse direction-stretched film-forming step wherein a transverse direction-stretched film is formed by transporting, and stretching in a perpendicular direction to the transport direction, a material D of the two or more materials, and a lamination step wherein the machine direction-stretched film and transverse direction-stretched film are laminated. The third aspect comprises an stretched film-forming step wherein one of a machine direction-stretched film and a transverse direction-stretched film is formed by transporting, and stretching in one of an identical direction and a perpendicular direction to the transport direction, two or more materials having positive and negative intrinsic double refraction values, and a lamination step wherein the stretched films are laminated.

According to the methods of manufacturing a retardation plate of the first to the third aspects, a wide band retardation plate which gives uniform phase difference characteristics to incident light over the whole visible wavelength region can be efficiently and continuously manufactured at low cost by a simple production process, and as the raw material can be selected regardless of whether the intrinsic double refraction value is positive or negative, a retardation plate can be efficiently manufactured with a large selection of raw materials.

DESCRIPTION OF THE PREFERRED EMBODIMENTS

Figure 1:
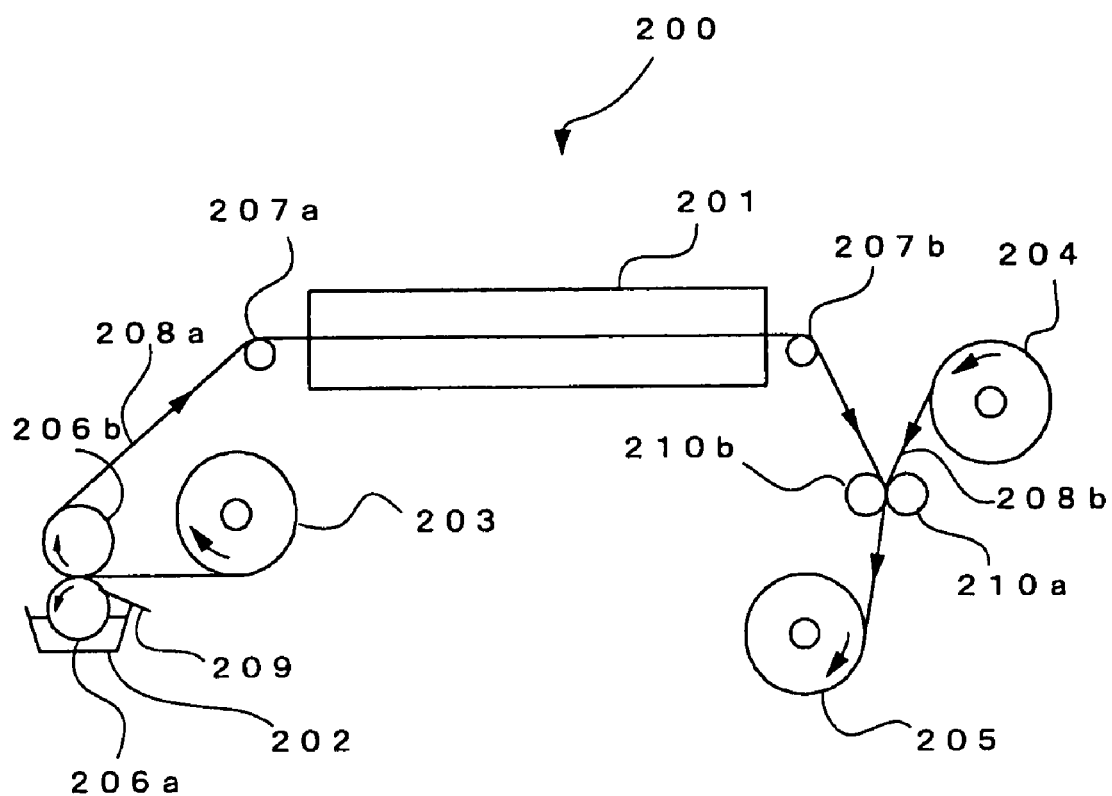
FIG. 1 is a drawing specifically describing one example of the dry lamination method.

Retardation Plate and Retardation Plate Manufacturing Method

The retardation plate of the present invention is a laminate of two or more materials having different intrinsic double refraction values, wherein, if the values of the retardation (Re) at a wavelength of 450 nm, 550 nm and 650 nm are respectively Re(450), Re(550) and Re(650), Re(450)<Re(550)<Re(650). In the retardation plate of the present invention, incident light is given phase difference characteristics due to layers wherein two or more materials having the aforesaid different intrinsic double refraction values, are laminated.

The retardation plate of the present invention comprises three aspects, i.e., a first aspect wherein the two or more materials both have positive intrinsic double refraction values, a second aspect wherein the two or more materials both have negative intrinsic double refraction values, and a third aspect wherein the two or more materials have positive and negative intrinsic double refraction values.

—Retardation Plate According to the First Aspect—

The retardation plate of the first aspect is an aspect wherein two or more materials having positive intrinsic double refraction values are laminated. In the first aspect, it is preferred to arrange the slow axis of each layer to be perpendicular by arranging the orientation directions (orientation axes) of the molecular chains of each layer to intersect perpendicularly.

In the first aspect, when three or more materials having positive intrinsic double refraction values are respectively laminated, to make the orientation directions (orientation axes) or slow axes of the molecular chains in these layers intersect perpendicularly, by considering materials with a positive intrinsic double refraction value having close values of Re(450)/Re(550) as one type of material, they may be broadly divided into two materials depending on the value of Re(450)/Re(550), and each layer of these two materials is laminated so that the orientation directions (orientation axes) or slow axes of the molecular chains intersect perpendicularly.

In the aforesaid first aspect, by manufacturing the retardation plate in this way, the retardation expressed is a complex retardation which is the result of the characteristics of each layer canceling each other out. In the retardation plate of the first aspect, two or more materials all having positive intrinsic double refraction values are combined, and by adjusting the stretching conditions such as the stretching direction and draw ratio, the wavelength dispersion of the retardation expressed is controlled, and Re/λ imparts substantially uniform phase difference characteristics to incident light over the whole visible wavelength region.

<Materials of the First Aspect>

Examples of the material in the first aspect, in addition to materials having a positive intrinsic double refraction value (hereafter, referred to simply as "positive materials"), may also comprise other possible components as desired. This "material having a positive intrinsic double refraction value" means a material showing an optically positive monoaxiality when the molecules are oriented in a monoaxial sequence.

For example, when the above positive material is a resin, it refers to a resin wherein, when light is incident on a layer wherein the molecules have a monoaxial orientation, the refractive index of light in the orientation direction is larger than the refractive index of light in a direction perpendicular to the orientation direction.

Examples of the above positive material are resins, rod-shaped liquid crystals and rod-shaped liquid crystal polymers. These may be used alone, or two or more may be used together. In the present invention, of these materials, resins are preferred.

Examples of resins are olefin polymers (e.g., polyethylene, polypropylene, norbornene polymers, cycloolefin polymers), polyester polymers (e.g., polyethylene terephthalate, polybutylene terephthalate), polyarylene sulfide polymers (e.g., polyphenylene sulfide), polyvinyl alcohol polymers, polycarbonate polymers, polyarylate polymers, cellulose ester polymers (whereof some have a negative intrinsic double refraction value), polyether sulfone polymers, polysulfone polymers, polyallyl sulfone polymers, polyvinyl polymers or multi-component (bipolymer, terpolymer) copolymers. These may be used alone, or two or more may be used together.

In the present invention, of these, as the material used for the layer having the lower (Re(450)/Re(550)) value, olefin polymers are preferred, and of these olefin polymers, from the viewpoint of light transmittance characteristics, heat resisting properties, dimensional stability and photoelasticity characteristics, norbornene polymers are particularly preferred. Examples of the above olefin polymers are "ARTON" from JSR Corporation, "ZEONEX" and "ZEONOR" from Nippon Zeon Co., Ltd. and "APO" from Mitsui Chemicals, Inc.

The above norbornene polymers have a norbornene skeleton as a repeating unit. Specific examples are given in JP-A No. 62-252406, JP-A No. 62-252407, JP-A No. 02-133413, JP-A No. 63-145324, JP-A No. 63-264626, JP-A No. 01-240517, Japanese Patent Application Publication UP-B) No. 57-8815, JP-A No. 05-39403, JP-A No. 05-43663, JP-A No. 05-43834, JP-A No. 05-70655, JP-A No. 05-279554, JP-A No. 06-206985, JP-A No. 07-62028, JP-A No. 08-176411 and JP-A No. 09-241484, but are not limited to these. One of these may be used alone, or two or more may be used together.

Of these norbornene polymers, those with a repeating unit represented by any of the following structural formulae (I) to (IV) are preferred.

Formula (I)

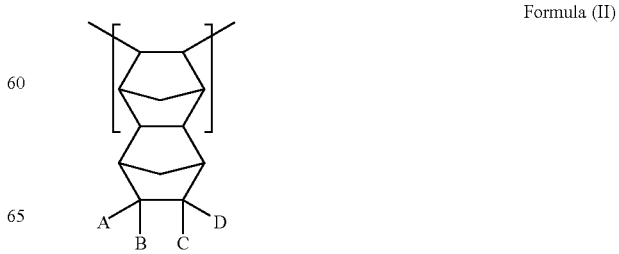

Formula (II)

-continued

Formula (III)

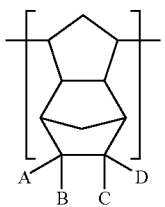

Formula (IV)

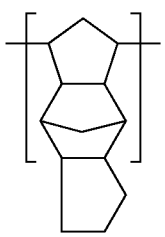

In the aforesaid structural formulae (I) to (IV), A, B, C and D are independent and represent a hydrogen atom or monovalent organic group.

Of these norbornene polymers, hydrated polymers from the hydration addition of polymers obtained by metathesis polymerization of at least one type of compound represented by the following structural formulae (V) and (VI) with a copolymerizable unsaturated cyclic compound, are preferred.

Formula (V)

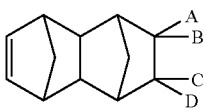

Formula (VI)

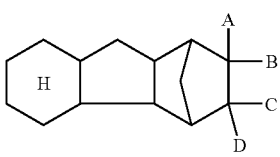

In the aforesaid structural formulae, A, B, C and D are independent and represent a hydrogen atom or monovalent organic group.

The mass average molecular weight of the above norbornene polymer is preferably 5,000 to 1,000,000, but more preferably 8,000 to 200,000.

There is no particular limitation on the other components which may be contained in the material of the first aspect provided that they do not interfere with the effect of the invention, and they may be suitably selected according to the purpose.

In addition, when the retardation plate (the retardation plate of the first to third aspects) of the present invention is used for an optical application (e.g., display), the glass transition point when the aforesaid material (material having a positive or negative intrinsic double refraction value) is a resin, is preferably 110° C. or more, but more preferably 120° C. or more.

<Composition of the Retardation Plate of the First Aspect>

The retardation plate of the first aspect comprises two or more materials having different positive intrinsic double refraction values laminated together, as described above. In the first aspect, it is more preferred to provide an adhesive layer which can make the layers adhere. The material of this adhesive layer is preferably one which does not affect the wavelength dispersion of the expressed retardation, and in particular, a material which does not affect the incident light in the whole visible wavelength region.

The material of the above adhesive layer is preferably a material which is compatible with the material of each layer. Specifically, when the resin having a positive intrinsic double refraction value is a norbornene polymer, the material of the adhesive layer is an adhesive containing an aliphatic ester polymer, aliphatic ester urethane polymer, aromatic ester polymer, aromatic ester urethane polymer or ether polymer. These materials may be used alone, or two or more may be used together.

The thickness of the retardation plate of the first aspect is preferably 30 μm to 300 μm, but more preferably 50 μm to 250 μm. The thickness of each layer is preferably 10 μm to 200 μm, but more preferably 20 μm to 150 μm. The thickness of the adhesive layer is preferably such that the product of the birefringence and thickness of this adhesive layer is smaller, specifically, 0.2 μm to 20 μm is preferred, and 0.5 μm to 10 μm is more preferred.

<Method of Manufacturing the Retardation Plate of the First Aspect>

In the methods of manufacturing the retardation plate of the present invention, according to the method of manufacturing the retardation plate of the first aspect, a machine direction-stretched film is formed by transporting and stretching in an identical direction to the transport direction, a material A of two or more materials having different positive intrinsic double refraction values (machine direction-stretched film-forming step), and a transverse direction-stretched film is formed by transporting, and stretching in a perpendicular direction to the transport direction, a material B of the aforesaid two or more materials (transverse direction-stretched film-forming step).

"Material A" and "Material B" are materials having different intrinsic double refraction values. In the method of manufacturing the retardation plate of the first aspect, when three or more materials having positive intrinsic double refraction values are laminated, materials having a positive intrinsic double refraction value are classified into two types as materials having close values of Re(450)/Re(550), and these materials are stretched as "Material A" and "Material B".

The stretching method may be uniaxial stretching, or biaxial stretching for the purpose of controlling the thickness direction.

If biaxial stretching is performed, in the retardation plate obtained, the stretching is performed by orientating the molecular chains mainly in one of the longitudinal and transverse directions so that the orientation axes in each layer intersect perpendicularly.

It is preferred that, after stretching, the formed machine direction-stretched film and transverse direction-stretched film are laminated (lamination step). In this lamination step, from the viewpoint of efficiency and space saving, the stretched films are preferably transported in the same direction and laminated together. The lamination is preferably performed by sticking the stretched films together, but more preferably by sticking them together with the slow axes of the stretched films perpendicular to one another. By manufacturing the retardation plate in this way, a wideband retardation plate which gives uniform phase difference characteristics over the whole visible wavelength region can be efficiently, continuously and economically manufactured by a simple process using raw materials having positive intrinsic double refraction values.

There is no particular limitation on the sticking method, for example, the films may be coated with an adhesive and stuck together, the films can be stuck together with an adhesive film sandwiched between them, or they may be stuck together by the dry lamination method using an adhesive.

The material of the adhesive or adhesive film is identical to the aforesaid material of the adhesive layer. The adhesive coating amount is preferably of the order of 1 g/m² to 10 g/m² in terms of solid mass. The thickness of the adhesive film is preferably of the order of 0.5 μm to 10 μm.

In the dry lamination method, the adhesive is generally coated uniformly on the adhesive substrate and dried, and then pressed onto the other adhesive substrate under pressure. In this dry lamination method, it is preferred to leave some parts of both adhesive substrates where adhesive is not coated so that adhesive does not adhere to the sticking rollers, and release of pressure between the rollers is automatic. The adhesive used in this dry lamination method is preferably a urethane resin, and preferably a two-solution type curing resin cured by mixing and reacting a main agent (OH group-containing compound) and curing agent (NCO group-containing compound). This adhesive may be dissolved in a solvent to make an adhesive solution, or it may be a non-solvent type adhesive which does not use a solvent, but from the viewpoints of energy-saving, reduction of remaining solvent amount and faster processing, the non-solvent type is preferred. If a solvent is used, this solvent is for example preferably toluoyl ethylene acetate or ethyl acetate. In this case, the solids concentration in the adhesive solution is preferably of the order of 20% by mass to 40% by mass. The pressure used for pressurization is preferably of the order of 1 kg/cm² to 50 kg/cm². When a retardation plate is manufactured from a laminate of three or more layers by laminating three or more materials by the dry lamination method, it is preferred to increase process efficiency by sticking the third layer on when two layers are stuck together and laminated without providing a step for winding the laminate.

Here, an example of the dry lamination method will be specifically described referring to FIG. 1. A dry lamination apparatus 200 shown in FIG. 1 comprises a first stretched film supply means, second stretched film supply means, adhesive coating means, transport means, heating/drying means, sticking means and rolling means.

The first stretched film supply means comprises a first film delivery apparatus 203 which supplies a first stretched film 208a.

The second stretched film supply means comprises a second film delivery apparatus 204 which supplies a second stretched film 208b.

The adhesive coating means comprises an adhesive housing apparatus 202 which accommodates adhesive, adhesive coating rollers 206a, 206b, and a doctor blade 209. In this adhesive coating means, the adhesive coating roller 206a is arranged so that its surface comes in contact with the aforesaid adhesive and first stretched film 208a. The adhesive coating roller 206b is arranged so that its surface is in contact with the first stretched film 208a. In this adhesive coating means, the adhesive which was adhering to the surface of the adhesive coating roller 206a is scratched off and adjusted to a uniform thickness by the doctor blade 209 as the roller rotates in the direction of the arrow, and is uniformly coated on the first stretched film 208a.

The transport means comprises a transport roller 207a and transport roller 207b which transport the first stretched film 208a due to rotation.

The heating/drying means comprises a heating/drying apparatus 201 which can dry the adhesive applied to the first stretched film 208a.

The sticking means comprises stick/nip rollers 210a, 210b which can stick the first stretched film 208a and second stretched film 208b together.

In the dry lamination apparatus 200, first, the first stretched film 208a is supplied and transported in the direction of the arrow from the first film delivery apparatus 203 which rotates in the direction of the arrow. When the first stretched film 208a is transported between the adhesive rollers 206a, 206b in contact with the rollers, the adhesive which was adhering to the surface of the adhesive roller 206a is uniformly applied. Subsequently, it is further transported in the direction of the arrow above the transport roller 207a to the heating/drying apparatus 201. In the first stretched film 208a which was transported to the heating/drying apparatus 201, the adhesive is uniformly applied to the surface and dried by heating. The first stretched film 208a is then transported in the direction of the arrow, above the transport roller 207b, and is transported to the stick/nip rollers 210a, 210b. At the same time, the second stretched film 208b is supplied from the second film delivery apparatus 204 which rotates in the direction of the arrow, and is transported to the stick/nip rollers 210a, 210b in the direction of the arrow. In the stick/nip rollers 210a and 210b, the first stretched film 208a and second stretched film 208b are stuck together by the bonding force in the nip part, and are thus laminated together to manufacture the retardation plate. The retardation plate is then transported to a winding apparatus 205, and wound.

The aforesaid materials having a positive intrinsic double refraction value are as described above, and preferred materials are as described above.

One embodiment of the method of manufacturing the retardation plate of the first aspect will now be described using FIG. 2.

Figure 2:
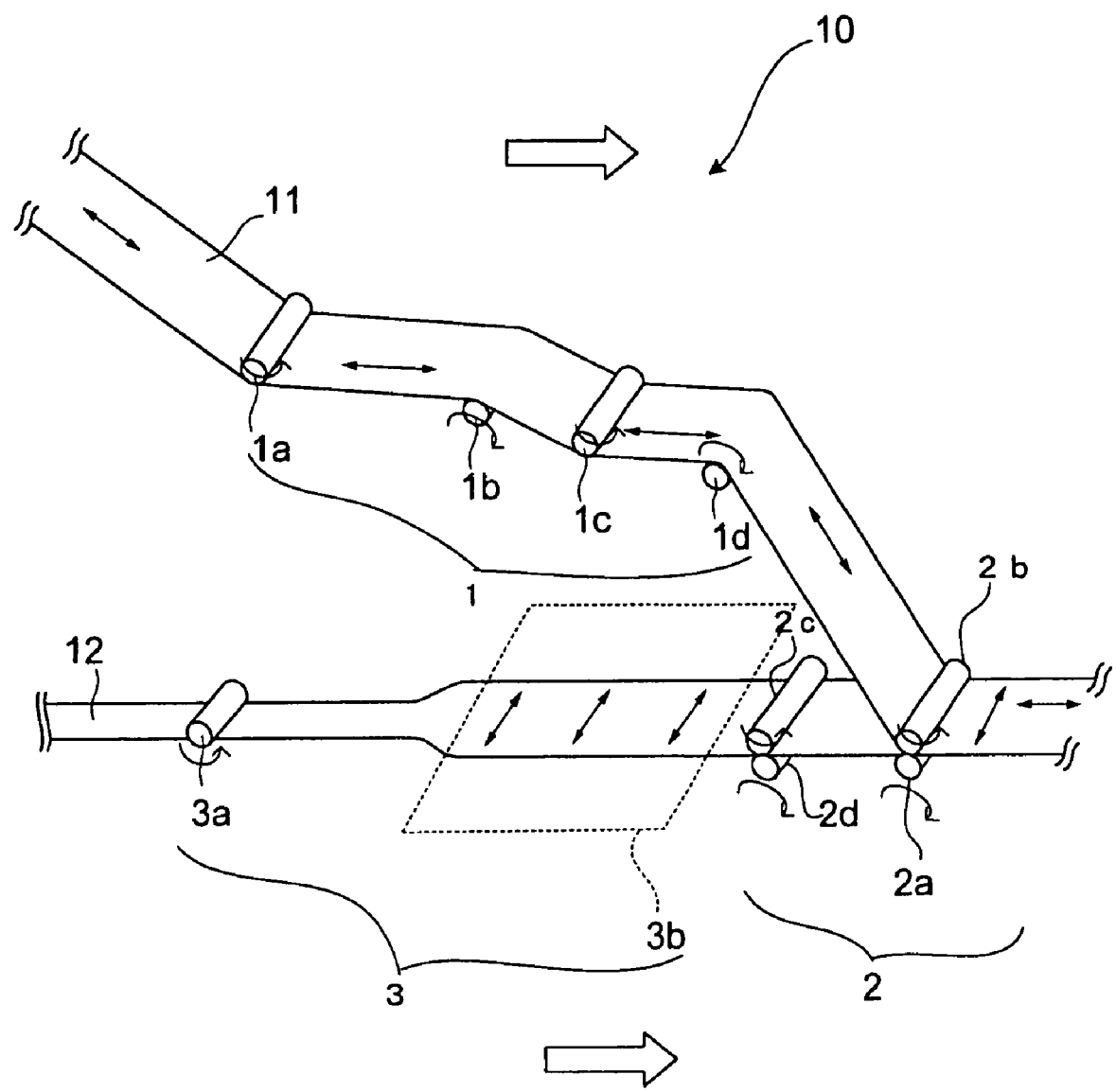
FIG. 2 is a schematic drawing roughly describing one example of the retardation plate manufacturing method of the present invention.

An stretching/sticking apparatus 10 shown in FIG. 2 comprises a machine direction-stretched part 1, a sticking part 2 and a transverse direction-stretched part 3.

The machine direction-stretched part 1 comprises machine direction-stretching low speed rollers 1a, 1b and machine direction-stretching high speed rollers 1c, 1d.

The sticking part 2 comprises stick/nip rollers 2a, 2b and adhesive coating rollers 2c, 2d.

The transverse direction-stretched part 3 comprises a transport direction adjustment roller 3a and a transverse direction-stretching apparatus 3b.

In the stretching/sticking apparatus 10, the machine direction-stretching low speed rollers 1a and 1b, the machine direction-stretching high speed rollers 1c and 1d, stick/nip rollers 2a and 2b, adhesive coating rollers 2c and 2d, and transport direction adjustment roller 3a can respectively be rotated by a drive part, shown below. The machine direction-stretching low speed rollers 1a, 1b and the machine direction-stretching high speed rollers 1c, 1d are arranged in this order from upstream to downstream. Heating means, shown below, are respectively installed around and inside the machine direction-stretching low speed rollers 1a, 1b and machine direction-stretching high speed rollers 1c, 1d, and control the stretching temperature of the stretched substrate.

In the stretching/sticking apparatus 10, the material A comprising a resin having a positive intrinsic double refraction value and the material B having a positive intrinsic double refraction value are first transported in the direction of the arrow in FIG. 2 (transport direction). Herein, the machine direction-stretching high speed roller 1c and machine direction-stretching high speed roller 1d are set that they rotate at higher speed than the machine direction-stretching low speed roller 1a and machine direction-stretching low speed roller 1b. The machine direction-stretching low speed roller 1a and machine direction-stretching high speed roller 1c are set so that they rotate in the opposite direction to the machine direction-stretching low speed roller 1b and machine direction-stretching high speed roller 1d (direction of the arrows shown in the figure).

The material A comprising a resin having a positive intrinsic double refraction value which was transported to the machine direction-stretched part 1 in the stretching/sticking apparatus 10, comes in contact successively with the machine direction-stretching low speed rollers 1a, 1b and machine direction-stretching high speed rollers 1c, 1d, and while being transported in the transport direction shown in the figure, a tensile force is applied due to the rotation speed difference between the machine direction-stretching low speed rollers 1a, 1b and machine direction-stretching high speed rollers 1c, 1d, and the material is stretched in the transport direction (longitudinal direction of the film) due to this rotation speed difference. At this time, temperature control can be performed by the aforesaid heating means while the material A is stretched, so the material A can easily be adjusted to suitable stretching conditions depending on the nature of the material and stretching speed (roller speed difference). After stretching, the material A comprising a resin having a positive intrinsic double refraction value is stuck to the material B comprising a resin having a positive intrinsic double refraction value in the sticking/nip rollers 2a, 2b which rotate in the direction shown in the figure, and is then further transported in the transport direction shown in the figure.

On the other hand, the material B comprising a resin having a positive intrinsic double refraction value passes beneath the transport direction adjustment roller 3a, and while being transported in the transport direction shown in the figure, is transverse direction-stretched (tenter stretching) by the transverse direction-stretching apparatus (tenter stretching apparatus) 3b in the transverse direction-stretching unit 3. After an adhesive is coated by the adhesive coating rollers 2c, 2d in the sticking part 2, it is stuck to the material B comprising a resin having a positive intrinsic double refraction via the adhesive in the sticking/nip rollers 2c, 2d, and transported in the transport direction shown in the figure.

In the stretching/sticking apparatus 10, by adjusting the draw ratio and stretching temperature by the rotation speed of the rollers and heating means, the retardation plate of the first aspect having the target retardation can be efficiently manufactured.

There is no particular limitation on the heating means provided that it can warm the stretching substrate to a suitable temperature. Any heating means known in the art can be used, such as hot air, heating rollers and infrared heaters such as near infrared heaters and far infrared heaters. It is preferred that these heating means have an apparatus not only for heating but for controlling temperature. One of more of these heating means may be used alone, or two or more may be used together.

There is no particular limitation on the number of rollers in the machine direction-stretched part 1, which may be chosen according to the nature of the material of the stretching substrate and stretching speed, etc.

In the embodiment shown in FIG. 2, stretching of material A comprising a resin having a positive intrinsic double refraction value, stretching of material B comprising a resin having a positive intrinsic double refraction value and sticking were performed continuously, but the present invention is not limited thereto. For example, stretching of material A comprising a resin having a positive intrinsic double refraction value and stretching of material B comprising a resin having a positive intrinsic double refraction value may be performed separately. Alternatively, the stretching and sticking of the films may be performed separately. These cases offer the advantage of space saving if the stretched films are temporarily wound.

In the aforesaid embodiments, if the dry lamination method is used as the adhesion method, a drying means to dry the adhesive is preferably provided between the adhesive coating rollers 2c, 2d and the stick/nip rollers 2a, 2b. There is no particular limitation on this drying means, examples being drying means known in the art such as for example warm air or a hot blast, or drying by dehumidification air.

There is no particular limitation on the stretching temperature, but if the minimum glass transition temperature of the basic material (material having a positive intrinsic double refraction value) in each layer is Tg (min), it is preferred to set it within the range (Tg (min)−30)° C. to (Tg (min)+30)° C.

In the method of manufacturing the retardation plate of the first aspect, to efficiently laminate so that the stretching directions intersect perpendicularly, stretching is performed so that the transport directions of the stretched films coincide with each other and the slow axes intersect perpendicularly, therefore steps such as chip cutting can be omitted. In other words, as the retardation plate of the first aspect is a laminate of layers using two or more types of resin having positive intrinsic double refraction values, by making the stretching directions of each layer perpendicular, the slow axes of the laminate of two or more layers can be arranged perpendicular to each other without fail. Hence, it is unnecessary to go through the delicate and complicated angle matching during chip cutoff or chip sticking of the stretched film which was required for manufacture of conventional laminated type retardation plates, so retardation plates can now be efficiently and continuously manufactured by a simple production process. Moreover, as the manufactured retardation plate can be continuously wound, storage is also simple and easy.

—Retardation Plate of the Second Aspect—

The retardation plate of the second aspect is an aspect wherein two or more types of material having negative intrinsic double refraction values are laminated. In the second aspect, it is preferred, as in the retardation plate of the first aspect, that the slow axes of the layers intersect perpendicularly by making the orientation directions (orientation axes) of the molecular chains in each layer intersect perpendicularly.

In the aforesaid second aspect, when three or more types of materials having negative intrinsic double refraction values are laminated, in order to make the orientation directions (orientation axes) or slow axes of the molecular chains in these layers intersect perpendicularly, of these materials having a negative intrinsic double refraction value, materials having close values of Re(450)/Re(550) are considered as one material. Hence, the materials may be broadly divided into two types depending on the value of Re(450)/Re(550), and the layers preferably laminated for each material so that in these two kinds of materials, the orientation directions (orientation axes) or slow axes of the molecular chains intersect perpendicularly.

In the aforesaid second aspect, by manufacturing a retardation plate in this way, the expressed retardation is the retardation of a composite body wherein the characteristics of each layer cancel each other out. In the retardation plate of the second aspect, two or more materials having different negative intrinsic double refraction values are stuck together, and by adjusting stretching conditions such as the stretching direction and draw ratio, the wavelength dispersion of the expressed retardation is controlled, and Re/λ imparts substantially uniform phase difference characteristics to incident light over the whole visible wavelength range.

<Material of the Second Aspect>

The materials in the second aspect, in addition to materials having a negative intrinsic double refraction value (hereafter, referred to simply as "negative materials"), may also comprise other possible components as desired. This "material having a negative intrinsic double refraction value" means a material showing an optically negative monoaxiality when the molecules are oriented in a monoaxial sequence.

For example, when the above negative material is a resin, it refers to a resin wherein, when light is incident on a layer wherein the molecules have a monoaxial orientation, the refractive index of light in the orientation direction is smaller than the refractive index of light in a direction perpendicular to the orientation direction.

Examples of the above negative material are resins, discotic liquid crystal and discotic liquid crystal polymers. These may be used alone, or two or more may be used together. In the present invention, of these materials, resins are preferred.

The aforesaid resin may for example be polystyrene, a polystyrene polymer (copolymer of styrene and/or a styrene derivative with other monomers), polyacrylonitrile polymer, polymethylmethacrylate polymer, cellulose ester polymers (whereof some have positive intrinsic double refraction values), or multi-component (bipolymer, terpolymer) copolymerization polymers. These may be used alone, or two or more may be used together.

The aforesaid polystyrene polymer is preferably at least one copolymer of styrene and/or a styrene derivative, acrylonitrile, maleic anhydride, methyl methacrylate and butadiene. In the present invention, of these moieties, at least one selected from polystyrene, polystyrene polymers, polyacrylonitrile polymers and polymethylmethacrylate polymers is preferred. Of these, from the viewpoint of high birefringence, polystyrene and polystyrene polymers are more preferred, and from the viewpoint of heat resistance, copolymers of styrene and/or a styrene derivative with maleic anhydride are particularly preferred.

<Composition of the Retardation Plate of the Second Aspect>

The composition of the retardation plate of the second aspect, as mentioned above, is a composition wherein two or more different materials having different negative birefringence values are laminated. Also in the second aspect, as in the first aspect, an adhesive layer which sticks well to the other layers is preferably provided. The material of this adhesive layer is identical to that of the first aspect.

The thickness of the retardation plate, thickness of each layer and thickness of the adhesive layer are identical to those of the first aspect.

<Method of Manufacturing the Retardation Plate of the Second Aspect>

Of the methods of manufacturing the retardation plate in the present invention, in the method of manufacturing the retardation plate according to the second aspect, a material C of two or more materials having a negative intrinsic double refraction value is transported and stretched in an identical direction to the transport direction to form a machine direction-stretched film (machine direction-stretched film-forming step), and a material D of the aforesaid two or more materials is transported and stretched in a direction perpendicular to the transport direction to form a transverse direction-stretched film (transverse direction-stretched film-forming step), The aforesaid "Material C" and "Material D" are materials for which the intrinsic double refraction values differ. In the method of manufacturing the retardation plate of the second aspect, when three or more materials having negative intrinsic double refraction values are laminated, the materials having a positive intrinsic double refraction value are classified into two types by materials having close values of Re(450)/Re(550), and these materials are stretched as "Material C" and "Material D".

In the method of manufacturing the retardation plate of the second aspect, the preferred stretching method and lamination step are completely identical to the retardation plate manufacturing method of the first aspect. When the material has a negative intrinsic double refraction value, as mentioned above, the preferred materials are as described above.

The retardation plate of the second aspect, as in the method of manufacturing the retardation plate of the first aspect, may be efficiently manufactured for example by machine direction-stretching (longitudinally stretching) and transverse direction-stretching materials having a negative intrinsic double refraction value using the stretching/sticking apparatus 10 schematically shown in FIG. 2 so that the slow axes of each layer intersect perpendicularly.

In the method of manufacturing the retardation plate of the second aspect, to efficiently laminate so that the stretching directions intersect perpendicularly, stretching may be performed so that the transport directions of the stretched films coincide with each other and the stretching directions intersect perpendicularly, therefore steps such as chip cutting can be omitted. In other words, as the retardation plate of the second aspect is a laminate of layers using two or more types of resin having negative intrinsic double refraction values, by making the stretching directions of each layer perpendicular, the slow axes of the laminate of two or more layers can be arranged perpendicular to each other without fail. Hence, it is unnecessary to go through the delicate and complicated angle matching during chip cutoff or chip sticking of the stretched film which was required for manufacture of conventional laminated type retardation plates, so retardation plates can now be efficiently and continuously manufactured by a simple production process. Moreover, as the manufactured retardation plate can be continuously wound, storage is also simple and easy.

—Retardation Plate of the Third Aspect—

The aforesaid retardation plate of the third aspect is an aspect wherein two or more types of material having positive and negative intrinsic double refraction values are laminated together. In the third aspect, it is preferred that the slow axes of the layers intersect perpendicularly by making the orientation directions (orientation axes) of the molecular chains in each layer parallel to each other.

In the aforesaid third aspect, by manufacturing a retardation plate in this way by adjusting stretching conditions, the expressed retardation is the retardation of a composite body wherein the characteristics of each layer cancel each other out. In the retardation plate of the third aspect, two or more materials having positive and negative intrinsic double refraction values are stuck together, and by adjusting stretching conditions such as the stretching direction and draw ratio, the wavelength dispersion of the expressed retardation is controlled, and Re/λ imparts substantially uniform phase difference characteristics to incident light over the whole visible wavelength range.

<Material of the Third Aspect>

The materials having a positive intrinsic double refraction value and the materials having a negative value are as mentioned above.

<Composition of the Retardation Plate of the Third Aspect>

In the composition of the retardation plate of the third aspect, as mentioned above, two different materials having positive and negative intrinsic double refraction values are laminated. Also in the third aspect, as in the first aspect above, it is preferred to provide an adhesive layer which makes each layer adhere well. The material of this adhesive layer is identical to that of the first aspect above.

The thickness of the retardation plate, thickness of each layer and thickness of the adhesive layer in the third aspect are respectively identical to those of the first aspect.

<Method of Manufacturing the Retardation Plate of the Third Aspect>

Of the methods of manufacturing the retardation plate in the present invention, in the method of manufacturing the retardation plate of the third aspect, two or more materials having positive and negative intrinsic double refraction values are transported, and stretched in an identical direction or perpendicular direction to the transport direction to form a machine direction-stretched film or a transverse direction-stretched film (stretched film-forming step).

Preferred aspects of the stretching method and lamination step are completely identical to those of the first aspect. The materials having positive and negative intrinsic double refraction values are those mentioned above, and preferred materials are also as mentioned above.

In the method of manufacturing the retardation plate of the third aspect, to efficiently laminate so that the stretching directions intersect perpendicularly, stretching is performed so that the transport directions of the stretched films coincide with each other and the slow axes intersect perpendicularly, therefore steps such as chip cutting can be omitted. In other words, as the retardation plate of the third aspect is a laminate of layers using two or more types of resin having positive and negative intrinsic double refraction values, by making the stretching direction of each stretched film parallel, the slow axes of the laminate of two or more layers can be made to intersect with each other without fail. Hence, it is unnecessary to go through the delicate and complicated angle matching during chip cutoff or chip sticking of the stretched film which was required for manufacture of conventional laminated type retardation plates, so retardation plates can now be efficiently and continuously manufactured by a simple production process. Moreover, as the manufactured retardation plate can be continuously wound, storage is also simple and easy.

—Physical Properties of the Retardation Plate of the Present Invention—

As the photoelasticity of the retardation plate of the present invention, 20 Bluestar or less is preferred, 10 Bluestar or less is more preferred, and 5 Bluestar or less is still more preferred. This is due to the following reasons.

In general, when a retardation plate is used as a component of a display element, it is stuck to other components (e.g., polarizing plate). There is a bias in the stress when it is stuck, and a larger stress acts on the ends than at the center. As a result, a difference arises in the retardation so that the ends may appear whiter and display properties of the display element may be impaired. Therefore, if the photoelasticity of the retardation plate is within the above numerical limits, even if there is a bias in the stress when it is stuck, the partial difference arising in the retardation (Re) can be suppressed which is more useful in components such as display elements.

—Preferred Combination of Materials in the Retardation Plate of the Present Invention—

In the retardation plate of the present invention, from the viewpoint of wavelength dispersion over the whole visible wavelength region, if the values of the retardation (Re) at wavelengths of 450 nm, 550 nm and 650 nm are respectively Re(450), Re(550), Re(650), there is no particular limitation provided that Re(450)<Re(550)<Re(650) is satisfied, but it is more preferred that the following physical properties are also satisfied.

If the absolute value of the retardation (Re) at a wavelength of 450 nm and a wavelength of 550 nm is respectively Re(450) and Re(550), from the viewpoint of obtaining a retardation where the characteristics of each layer cancel each other out, it is more preferred that the laminated layers include at least a combination of two layers whose difference in the value of (Re(450)/Re(550)) is 0.03 or more. It is still more preferred to include a combination of two layers whose difference is 0.05 or more.

Further, if the absolute value of the retardation (Re) at a wavelength of 450 nm and a wavelength of 550 nm is respectively Re(450) and Re(550), from the viewpoint of obtaining a retardation plate suitable as a ¼ wave plate and ½ wave plate, it is preferred that the laminated layers include at least a combination of two layers for which the value of (Re(450)/Re(550)) differs, and that the value of Re(550) in the layer having a smaller value of (Re(450)/Re(550)), is larger than the value of Re(550) in the layer having a larger value of (Re(450)/Re(550)).

There is no particular limitation on the positions of the aforesaid layer combinations in the retardation plate, and they may or may not be in mutual contact in the vertical direction.

Regarding preferred combinations of the above materials, if the value of the retardation (Re) at a wavelength of 450 nm, 550 nm and 650 nm is respectively Re(450), Re(550), Re(650), from the viewpoint of effectively satisfying Re(450)<Re(550)<Re(650), it is particularly preferred to combine a material for which the wavelength dispersion of the characteristic refractive value is small as a resin having a positive or negative intrinsic double refraction value, and a material for which the wavelength dispersion of the characteristic refractive value is large as another resin having a positive or negative intrinsic double refraction value.

For example, if a norbornene polymer is used as the material having a positive intrinsic double refraction value and a high retardation (Re), it is preferred that a material having a large wavelength dispersion of the intrinsic double refraction value is used as the other material having a positive intrinsic double refraction value (material having a small retardation (Re). Specifically, if the intrinsic double refraction value (Δn) at a wavelength of 450 nm and a wavelength of 550 nm is respectively Δn (450) and Δn (550), it is preferred to select it from resins satisfying the following relation:

$|\Delta n(450)/\Delta n(550)| \geq 1.02$

It is more preferred to select it from resins satisfying the following relation:

$|\Delta n(450)/\Delta n(550)| \geq 1.05$

It is preferred that the value of $|\Delta n(450)/\Delta n(550)|$ is large, but in the case of a resin, it is generally 2.0 or less.

Examples of materials having a large value of the (Re(450)/Re(550)) are polyester polymers (e.g., polyethylene terephthalate, polybutylene terephthalate), polyarylene sulfide polymers (e.g., polyphenylene sulfide), polycarbonate polymers, polyarylate polymers, polyether sulfone polymers, polysulfone polymers, polyallyl sulfone polymers and polyvinyl chloride polymers. Of these, polyester polymers polyarylene sulfide polymers and polyarylate polymers are preferred.

Examples of materials having a small value of (Re(450)/Re(550)) are olefin polymers and cycloolefin polymers (e.g., polyethylene, polypropylene, norbornene polymers), and cellulose ester polymers. Of these olefin polymers, norbornene polymers are particularly preferred.

In the retardation plate of the present invention, the aforesaid characteristic Re(450)<Re(550)<Re(650) can be satisfied by adjusting the mass ratio, stretching temperature and draw ratio of the material used for each layer.

For example, in the first aspect of the retardation plate of the present invention, if a norbornene polymer, polyethylene terephthalate and polycarbonate are used as the material (resin) having a positive intrinsic double refraction value, the short wavelength side largely reduces the retardation, so Re(450)<Re(550)<Re(650) is obtained as a result. By controlling the stretching temperature within the aforesaid limits, and by making Re($\lambda$)/$\lambda$ constant over the whole visible light wavelength region, a retardation plate exhibiting uniform phase difference characteristics over a wide band is obtained. Further, by adjusting the draw ratio, wide band ¼ wave and ½ wave characteristics can be obtained.

As mentioned above, the retardation plate of the present invention can impart uniform phase difference characteristics to light over a wide band (visible wavelength region), and although it is a laminate, it can be manufactured efficiently and at low cost by a simple production process. In the case of the retardation plate of the present invention, there is no need to take account of compatibility of materials when selecting raw materials, and as it can be manufactured with any combination of materials, i.e., the intrinsic double refraction values can be all positive, all negative, or positive and negative, a wide selection of materials is possible. It is also advantageous from the viewpoint of cost.

—Embodiment of Retardation Plate of the Present Invention—

Figure 3:
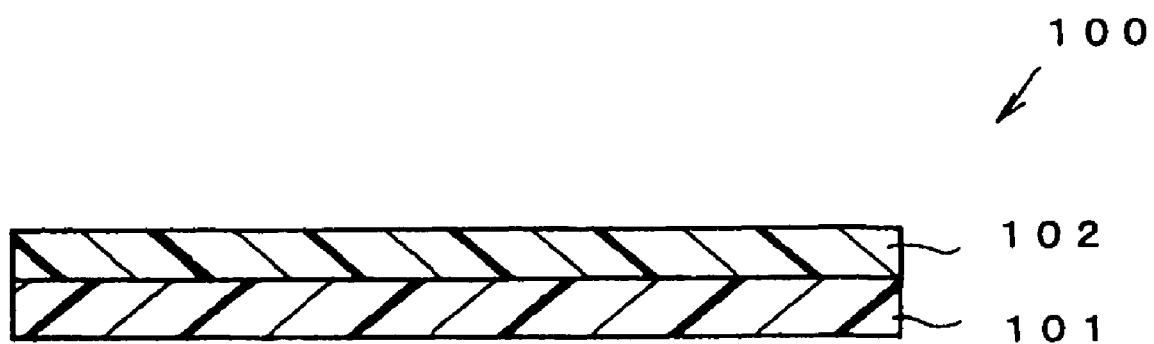
FIG. 3 is a schematic drawing showing one embodiment of the retardation plate of the present invention.

An example of one embodiment of the retardation plate in the present invention is shown in FIG. 3.

A retardation plate 100 is a retardation plate of the aforesaid first aspect. A layer 101 comprising a resin having a positive intrinsic double refraction value, and a layer 102 comprising a resin having a different positive intrinsic double refraction value from this resin, are laminated together.

The layer 101 and layer 102 both have birefringence, and they are laminated with their slow axes perpendicular to each other. Specifically, the orientation direction of the molecular chain in the resin having the positive intrinsic double refraction value contained in the layer 101, is perpendicular to the orientation direction of the molecular chain in the resin having the positive intrinsic double refraction value contained in the layer 102. The retardation of the retardation plate 100 is the sum of the retardations in the layer 101 and layer 102, so by laminating the layer 101 and layer 102 so that their slow axes are perpendicular, the retardation on the short wave side of the retardation plate 100 can be made small, and the retardation on the long wavelength side can be made large. As a result, the retardation Re($\lambda$) and the ratio Re($\lambda$)/$\lambda$ at a wavelength $\lambda$ of the retardation plate 100, can be made approximately constant over the whole visible wavelength region.

In the above mentioned embodiment, a specific example was given of a retardation plate comprising respectively one layer each of two types of resins having different positive intrinsic double refraction values, but the retardation plate of the present invention is not limited thereto, and it may comprise three layers, four layers, or a laminate of three or more layers. By laminating three or more layers, the physical properties of the retardation plate are improved, so this is preferred.

—Applications of the Retardation Plate of the Present Invention—

By adjusting Re($\lambda$)/$\lambda$, the retardation plate of the present invention can be used as a wide band ¼ wave plate as a display device in various fields such as personal computers, AV equipment, portable information and telecommunications devices, games and simulation devices or car navigation systems, and can be used in a reflective liquid crystal display. Also, by adjusting Re($\lambda$)/$\lambda$, the retardation plate of the present invention can be used as a wide band ½ wave plate in PBS for projectors, etc.

When the retardation plate of the present invention is used as a circularly polarizing plate ($\lambda$/4 wave plate), over a wide wavelength range of 450 nm to 650 nm, it is preferred that, at least at wavelengths of 450 nm, 550 nm and 650 nm, the value of (retardation (Re)/wavelength) is 0.2 to 0.3. It is more preferred that, at least at wavelengths of 450 nm, 550 nm, and 650 nm, the value of (retardation (Re)/wavelength) is 0.23 to 0.27. It is still more preferred that, at least at wavelengths of 450 nm, 550 nm, and 650 nm, the value of (retardation (Re)/wavelength) is 0.24 to 0.26.

When the retardation plate of the present invention is used as a $\lambda$/2 plate, over a wide wavelength range of 450 nm to 650 nm, it is preferred that, at least at wavelengths of 450 nm, 550 nm and 650 nm, the value of (retardation (Re)/wavelength) is 0.40 to 0.60. It is more preferred that, at least at wavelengths of 450 nm, 550 nm, and 650 nm, the value of (retardation (Re)/wavelength) is 0.46 to 0.54, and still more preferred that it is 0.48 to 0.52.

According to the present invention described above, a wide band retardation plate which imparts uniform phase difference characteristics to incident light over the whole visible wavelength region, can be efficiently manufactured continuously at low cost by a simple production process. Moreover, as the raw materials can be selected regardless of whether they have a positive or negative intrinsic double refraction value, a method of manufacturing retardation plates offering a wide selectivity of raw materials can be provided.

(Circularly Polarizing Plate and ½ Wave Plate)

Next, a circularly polarizing plate and ½ wave plate using the retardation plate of the present invention, will be described.

The circularly polarizing plate is obtained by laminating a polarizing plate and the aforesaid retardation plate of the present invention.

For the retardation plate, over a wide wavelength range of 450 nm to 650 nm, it is preferred that, at least at wavelengths of 450 nm, 550 nm and 650 nm, the value of (retardation (Re)/wavelength) is 0.2 to 0.3, more preferred that at least at these three wavelengths, the value is 0.23 to 0.27, and still more preferred that at least at these three wavelengths, the value is 0.24 to 0.26.

The ½ wave plate of the present invention is obtained by laminating a polarizing plate and the aforesaid retardation plate of the present invention. For the retardation plate, over a wide wavelength range of 450 nm to 650 nm, it is preferred that, at least at wavelengths of 450 nm, 550 nm and 650 nm, the value of (retardation (Re)/wavelength) is 0.40 to 0.60, more preferred that at least at these three wavelengths, the value is 0.46 to 0.54, and still more preferred that at least at these three wavelengths, the value is 0.48 to 0.52.

—Polarizing Plate—

There is no particular limitation on the aforesaid polarizing plate, and those in the art may conveniently be used such as for example an iodine polarizing plate, a color polarizing plate using a dichromatic dye, or a polyene polarizing plate.

Of these polarizing plates, the iodine polarizing plate and the color polarizing plate can generally be manufactured by stretching a polyvinyl alcohol film, and adsorbing iodine or a dichromatic dye onto this. In this case, the polarization axis of this polarizing plate is in a perpendicular direction to the stretching direction of the film.

The aforesaid polarizing plate may have a protective layer. The protective layer preferably comprises a material with a high optical isotropy such as a cellulose ester, preferably triacetyl cellulose.

—Laminate—

The polarizing plate and the retardation plate are laminated so that the polarization transmission axis of this polarizing plate and the slow axis (the maximum refractive index direction) of this retardation plate, intersect. The angle of this intersection is preferably 30° to 60°, more preferably 40° to 50° and still more preferably 43° to 47°.

—Applications—

The circularly polarizing plate of the present invention is of simple construction and is easy to manufacture. It functions as a wide band $\lambda/4$ wave plate, and can be used in various fields, in particular the reflective liquid crystal display of the present invention mentioned later. The $\lambda/2$ wave plate of the present invention functions as a wide band $\lambda/2$ wave plate, and can also be used in various fields, in particular PBS for projectors.

(Reflective Liquid Crystal Display)

The reflective liquid crystal display of the present invention is formed by laminating a reflector, a liquid crystal cell and a polarizing plate together in this order. The retardation plate of the present invention is interposed between the reflector and the polarizing plate.

A preferred example of the construction of the reflective liquid crystal display comprises a reflector, liquid crystal cell, the retardation plate of the present invention and a polarizing plate laminated in this order, or alternatively, a reflector, the retardation plate of the present invention, a liquid crystal cell and a polarizing plate laminated in this order.

The retardation plate may be a retardation plate having $\lambda/4$ characteristics, the preferred numerical range for Re/$\lambda$ being identical to that of the retardation plate used for the circularly polarizing plate mentioned above. The reflective liquid crystal display of the present invention may also comprise other components if required.

In the aforesaid reflective liquid crystal display, when the retardation plate and the polarizing plate are laminated, the laminate is equivalent to the circularly polarizing plate of the present invention.

—Reflector—

There is no particular limitation on the aforesaid reflector, and those known in the art can be used.

The reflector is generally arranged on the outside of the reverse transparent substrate of the liquid crystal cell described later.

—Liquid Crystal Cell—

There is no particular limitation on the liquid crystal cell, and those known in the art can be used, for example, a TN liquid crystal layer may be filled between the front transparent substrate and reverse transparent substrate. In this case, the inside of the front transparent substrate and inside of the reverse transparent substrate are formed of an electrode layer comprising an electrically conducting film of ITO (indium stannic oxide). In the present invention, in addition to a TN liquid crystal layer, an STN liquid crystal layer may also be used.

The drive of the liquid crystal cell may be a matrix drive, or may be a segment drive. In the case of a matrix drive, it may be a simple matrix drive or an active matrix drive.

—Polarizing Plate—

There is no particular limitation on the polarizing plate, and those known in the art may be used.

In general, the polarizing plate is disposed on the outside of the front transparent substrate of the liquid crystal cell together with the retardation plate of the present invention.

The aforesaid reflective liquid crystal display is for a monochrome display, but in the present invention, a color filter layer may be further disposed between the front transparent substrate and the retardation plate of the present invention. By forming a color filter layer on the front transparent substrate, the display may also be used as a color display.

The monochrome display functions of the reflective liquid crystal display of the present invention will now be described.

When a voltage is not applied to the electrode layer (white display), if light is incident on the polarizing plate, this incident light will be plane polarized in the direction of the polarization axis by this polarizing plate. This plane polarized light is converted into circularly polarized light by the retardation plate of the present invention, and this is incident on the liquid crystal cell. Due to the liquid crystalline molecule of the liquid crystal layer, this circularly polarized light reaches the reflector as plane polarized light parallel to the polarization axis, and is reflected by the reflector so that it is again incident on the liquid crystal cell. Due to the liquid crystal layer, the incident plane polarized light becomes circularly polarized light. This passes through the retardation plate, is again converted into plane polarized light parallel to the polarization axis, passes through the polarizing plate, and becomes a white display.

Next, when a higher voltage than the liquid crystal saturation voltage is applied to the electrode layer (black display), the plane polarized light which passed through the polarizing plate is converted into circularly polarized light by the retardation plate of the present invention. This circularly polarized light is reflected by the reflector without change, passes through the liquid crystal cell without change, and then passes through the retardation plate of the present invention. In other words, the plane polarized light passes through the retardation plate of the present invention twice via the reflector until it reaches the polarizing plate again, so the phase difference of the plane polarized light is shifted by 90°, and the reflected light from this reflector does not pass through the polarizing plate so as to give a black display.

In the reflective liquid crystal display of the present invention, the plane polarized light is converted into circularly polarized light over practically the whole range of the visible spectrum by the wide band retardation plate of the present invention. As a result, decrease of color and contrast due to the wavelength dispersion of the light incident on the liquid crystal cell, are mitigated, and a high contrast display is obtained.

Hereafter, some examples of the present invention will be described, but the present invention is not limited to these examples.

Example 1

A laminated film was manufactured as follows using the stretching/sticking apparatus 10 shown in FIG. 2.

First, a non-stretched polycarbonate film (Mitsubishi Gas Chemical Company, Inc., thickness: 100 μm) was transverse direction-stretched (tenter stretched) at a draw ratio of 1.1 and an stretching temperature of 135° C. so as to obtain a film having a thickness of 92 μm. The retardation value (represented by Re(550)) at a wavelength of 550 nm was 341.6 nm.

Simultaneously, a norbornene film (Nippon Zeon Co., Ltd., ZEONOR: thickness: 100 μm) was transported in the same direction, and machine direction-stretched at a draw ratio of 2.2 and an stretching temperature of 130° C. so as to obtain a film having a retardation (Re(550)) of 477.1 nm and thickness 60 μm.

Next, the two kinds of film were stuck together using an adhesive (Dainippon Ink & Chemicals Inc., DICDRY, 5 g/m$^2$) in the longitudinal direction (film transport direction) by the dry lamination method, and a laminated film having a thickness of 155 μm was thus obtained. The drying means was the application of warm air (50° C., 0.2 m/s) after coating the adhesive but before sticking.

A film was thereby obtained for which the absolute values Re(450), Re(550) and Re(650) of the retardation (Re) at 450 nm, 550 nm and 650 nm were Re(450)=122.8 nm, Re(550)=145.7 nm and Re(650)=160.1 nm, respectively, and having wide band λ/4 wave plate characteristics.

The retardation (Re) of each sample at Re(450), Re(550), Re(650) and Re(750), and the value of Re(450)/Re(550), are shown in Table 1, respectively.

Example 2

A laminated film was manufactured as follows using the stretching/sticking apparatus 10 shown in FIG. 2.

First, a non-stretched polycarbonate film (Mitsubishi Gas Chemical Company, Inc., thickness: 100 μm) was machine direction-stretched at a draw ratio of 1.1 and an stretching temperature of 140° C. so as to obtain a film having a thickness of 92 μm. The retardation value (represented by Re(550)) at a wavelength of 550 nm was 316.4 nm.

Simultaneously, a norbornene film (Nippon Zeon Co., Ltd., ZEONOR: thickness: 100 μm) was transported in the same direction, and transverse direction-stretched (tenter stretched) at a draw ratio of 2.2 and an stretching temperature of 130° C. so as to obtain a film having a retardation (Re(550)) of 457.1 nm and thickness 45 μm.

Next, the two kinds of film were stuck together using an adhesive (Dainippon Ink & Chemicals Inc., DICDRY, 5 g/m$^2$) in the longitudinal direction (film transport direction) by the dry lamination method, and a laminated film having a thickness of 142 μm was thus obtained.

The drying means was the application of warm air (50° C., 0.2 m/s) after coating the adhesive but before sticking.

A film was thereby obtained for which the absolute values Re(450), Re(550) and Re(650) of the retardation (Re) at 450 nm, 550 nm and 650 nm were Re(450)=121.1 nm, Re(550)=147.0 nm and Re(650)=160.3 nm, respectively, and having wide band λ/4 wave plate characteristics.

The retardation (Re) of each sample at Re(450), Re(550), Re(650) and Re(750), and the value of Re(450)/Re(550), are shown in Table 1, respectively.

Example 3

A laminated film was manufactured as follows using the stretching/sticking apparatus 10 shown in FIG. 2.

First, polyethylene terephthalate was melt stretched at 290° C. by a T die, and cooling solidified on a casting drum at 30° C. to manufacture a non-stretched polyethelene terephthalate film (thickness: 45 μm). This non-stretched polyethylene terephthalate film was machine direction-stretched at a draw ratio of 1.15 and an stretching temperature of 90° C. so as to obtain a film of thickness 40 μm. The retardation (Re (550)) at a wavelength of 550 nm was 303.9 nm.

Simultaneously, a norbornene film (Nippon Zeon Co., Ltd., ZEONOR: thickness: 100 μm) was transported in the same direction, and transverse direction-stretched (tenter stretched) at a draw ratio of 2.2 and an stretching temperature of 130° C. so as to obtain a film having a retardation (Re(550)) of 457.1 nm and thickness 45 μm.

Next, the two kinds of film were stuck together using an adhesive (Dainippon Ink & Chemicals Inc., DICDRY, 5 g/m$^2$) in the longitudinal direction (film transport direction) by the dry lamination method, and a laminated film having a thickness of 90 μm was thus obtained.

The drying means was the application of warm air (50° C., 0.2 m/s) after coating the adhesive but before sticking.

A film was thereby obtained for which the absolute values Re(450), Re(550) and Re(650) of the retardation (Re) at 450 nm, 550 nm and 650 nm were Re(450)=124.4 nm, Re(550)=154.1 nm and Re(650)=165.1 nm, respectively, and having wide band λ/4 wave plate characteristics.

The retardation (Re) of each sample at Re(450), Re(550), Re(650) and Re(750), and the value of Re(450)/Re(550), are shown in Table 1, respectively.

Example 4

A laminated film was manufactured as follows using the stretching/sticking apparatus 10 shown in FIG. 2.

First, polyethylene terephthalate was melt stretched at 290° C. by a T die, and cooling solidified on a casting drum at 30° C. to manufacture a non-stretched polyethelene terephthalate film (thickness: 400 μm). This non-stretched polyethylene terephthalate film was machine direction-stretched (draw ratio=3.3) at an stretching temperature of 90° C., and then transverse direction-stretched (tenter stretching, draw ratio=3.3) at 120° C. so as to obtain a biaxially stretched film of thickness 40 μm. This biaxially stretched film was mainly oriented in the machine direction (longitudinal direction), and the retardation (Re(550)) at a wavelength of 550 nm was 309.2 nm.

Simultaneously, a norbornene film (Nippon Zeon Co., Ltd., ZEONOR: thickness: 100 μm) was transported in the same direction, and transverse direction-stretched (tenter stretched) at a draw ratio of 2.2 and an stretching temperature of 130° C. so as to obtain a film having a retardation (Re(550)) of 457.1 nm and thickness 45 μm.

Next, the two kinds of film were stuck together using an adhesive (Dainippon Ink & Chemicals Inc., DICDRY, 5 g/m$^2$) in the longitudinal direction (film transport direction) by the dry lamination method, and a laminated film having a thickness of 90 μm was thus obtained.

The drying means was the application of warm air (50° C., 0.2 m/s) after coating the adhesive but before sticking.

A film was thereby obtained for which the absolute values Re(450), Re(550) and Re(650) of the retardation (Re) at 450 nm, 550 nm and 650 nm were Re(450)=120.3 nm, Re(550)=148.3 nm and Re(650)=162.8 nm, respectively, and having wide band λ/4 wave plate characteristics.

The retardation (Re) of each sample at Re(450), Re(550), Re(650) and Re(750), and the value of Re(450)/Re(550), are shown in Table 1, respectively.

From Example 4, it is seen that even when the film is stretched and laminated biaxially, when the film is oriented mainly in the machine (longitudinal) direction or transverse direction, the same excellent properties are obtained as when the film is stretched monoaxially in the machine (longitudinal) or transverse directions.

Example 5

A laminated film was manufactured as follows using the stretching/sticking apparatus 10 shown in FIG. 2.

First, a non-stretched polycarbonate film (Mitsubishi Gas Chemical Company, Inc., thickness: 100 μm) was transverse direction-stretched (tenter stretched) at a draw ratio of 1.2 and an stretching temperature of 135° C. so as to obtain a film having a thickness of 86 μm. The retardation value (represented by Re(550)) at a wavelength of 550 nm was 634.1 nm.

Simultaneously, a norbornene film (Nippon Zeon Co., Ltd., ZEONOR: thickness: 200 μm) was transported in the same direction, and transverse direction-stretched (tenter stretched) at a draw ratio of 2.2 and an stretching temperature of 130° C. so as to obtain a film having a retardation (Re(550)) of 915.4 nm and thickness 90 μm.

Next, the two kinds of film were stuck together using an adhesive (Dainippon Ink & Chemicals Inc., DICDRY, 5 g/m$^2$) in the longitudinal direction (film transport direction) by the dry lamination method, and a laminated film having a thickness of 181 μm was thus obtained.

The drying means was the application of warm air (50° C., 0.2 m/s) after coating the adhesive but before sticking.

A film was thereby obtained for which the absolute values Re(450), Re(550) and Re(650) of the retardation (Re) at 450 nm, 550 nm and 650 nm were Re(450)=246.1 nm, Re(550)=280.8 nm and Re(650)=311.9 nm, respectively, and having wide band λ/2 wave plate characteristics.

The retardation (Re) of each sample at Re(450), Re(550), Re(650) and Re(750), and the value of Re(450)/Re(550), are shown in Table 1, respectively.

Comparative Example 1

A laminated film was manufactured as follows using the stretching/sticking apparatus 10 shown in FIG. 2.

First, a non-stretching polycarbonate film (Mitsubishi Gas Chemical Company, Inc., thickness: 100 μm) was machine direction-stretched at a draw ratio of 1.1 and an stretching temperature of 140° C. so as to obtain a film having a retardation (Re(550)) of 316.4 nm and thickness 92 μm.

Simultaneously, a norbornene film (Nippon Zeon Co., Ltd., ZEONOR: thickness: 100 μm) was transported in the same direction, and machine direction-stretched at a draw ratio of 2.2 and an stretching temperature of 130° C. so as to obtain a film having a retardation (Re(550)) of 477.1 nm and thickness 60 μm.

Next, the two kinds of film were stuck together using an adhesive (Dainippon Ink & Chemicals Inc., DICDRY, 5 g/m$^2$) in the longitudinal direction (film transport direction) by the dry lamination method, and a laminated film having a thickness of 155 μm was thus obtained.

The drying means was the application of warm air (50° C., 0.2 m/s) after coating the adhesive but before sticking.

A film was thereby obtained for which the absolute values Re(450), Re(550) and Re(650) of the retardation (Re) at 450 nm, 550 nm and 650 nm were Re(450)=817.1 nm, Re(550)=792.3 nm and Re(650)=777.1 nm, respectively, which are very high retardation values.

The retardation (Re) of each sample at Re(450), Re(550), Re(650) and Re(750), and the value of Re(450)/Re(550), are shown in Table 1, respectively.

Comparative Example 2

A laminated film was manufactured as follows using the stretching/sticking apparatus 10 shown in FIG. 2.

First, a non-stretched polycarbonate film (Mitsubishi Gas Chemical Company, Inc., thickness: 100 μm) was transverse direction-stretched (tenter stretched) at a draw ratio of 1.1 and an stretching temperature of 135° C. so as to obtain a film having a retardation (Re(550)) of 341.6 nm and thickness 92 μm.

Simultaneously, a norbornene film (Nippon Zeon Co., Ltd., ZEONOR: thickness: 100 μm) was transported in the same direction, and machine direction-stretched at a draw ratio of 2.2 and an stretching temperature of 130° C. so as to obtain a film having a retardation (Re(550)) of 457.1 nm and thickness 45 μm.

Next, the two kinds of film were stuck together using an adhesive (Dainippon Ink & Chemicals Inc., DICDRY, 5 g/m$^2$) in the longitudinal direction (film transport direction) by the dry lamination method, and a laminated film having a thickness of 141 μm was thus obtained.

The drying means was the application of warm air (50° C., 0.2 m/s) after coating the adhesive but before sticking.

A film was thereby obtained for which the absolute values Re(450), Re(550) and Re(650) of the retardation (Re) at 450 nm, 550 nm and 650 nm were Re(450)=823.1 nm, Re(550)=798.3 nm and Re(650)=784.4 nm, respectively, which are very high retardation values.

The retardation (Re) of each sample at Re(450), Re(550), Re(650) and Re(750), and the value of Re(450)/Re(550), are shown in Table 1, respectively.

Comparative Example 3

A laminated film was manufactured as follows using the stretching/sticking apparatus 10 shown in FIG. 2.

First, a norbornene film (Nippon Zeon Co., Ltd., ZEONOR: thickness: 100 μm) was transverse direction-stretched (tenter stretched) at a draw ratio of 2.2 and an stretching temperature of 130° C. so as to obtain a film having a retardation (Re(550)) of 457.1 nm and thickness 45 μm.

Simultaneously, a norbornene film (Nippon Zeon Co., Ltd., ZEONOR: thickness: 100 μm) was transported in the same direction, and machine direction-stretched at a draw ratio of 1.7 and an stretching temperature of 130° C. so as to obtain a film having a retardation (Re(550)) of 316.3 nm and thickness 73 μm.

Next, the two kinds of film were stuck together using an adhesive (Dainippon Ink & Chemicals Inc., DICDRY, 5 g/m$^2$) in the longitudinal direction (film transport direction) by the dry lamination method, and a laminated film having a thickness of 123 μm was thus obtained.

The drying means was the application of warm air (50° C., 0.2 m/s) after coating the adhesive but before sticking.

A film was thereby obtained for which the absolute values. Re(450), Re(550) and Re(650) of the retardation (Re) at 450 nm, 550 nm and 650 nm were Re(450)=143.9 nm, Re(550)=141.7 nm and Re(650)=140.8 nm, respectively. The values of the retardation (Re) satisfy Re(450)>Re(550)>Re(650), so the film was unsuitable as a wide band λ/4 wave plate.

The retardation (Re) of each sample at Re(450), Re(550), Re(650) and Re(750), and the value of Re(450)/Re(550), are shown in Table 1, respectively.

From Comparative Example 3, it is seen that the excellent characteristics of the embodiments are not obtained even if the same resins are stretched and laminated in different directions.

Example 6

A laminated film was manufactured as follows using the stretching/sticking apparatus 10 shown in FIG. 2.

First, a non-stretched polystyrene (thickness: 100 μm) was machine direction-stretched at a draw ratio of 2.1 and an stretching temperature of 105° C. so as to obtain a film of thickness 62 μm. The retardation (Re(550)) at a wavelength of 550 nm was 453.2 nm.

Simultaneously, a polymethylene acrylate film (thickness: 100 μm) was transported in the same direction, and transverse direction-stretched (tenter stretched) at a draw ratio of 2.4 and an stretching temperature of 110° C. so as to obtain a film of thickness 58 μm. The retardation (Re(550)) at a wavelength of 550 nm was 602.8 nm.

Next, the two kinds of film were stuck together using an adhesive (Dainippon Ink & Chemicals Inc., DICDRY, 5 g/m²) in the longitudinal direction (film transport direction) by the dry lamination method, and a laminated film having a thickness of 123 μm was thus obtained.

The drying means was the application of warm air (50° C., 0.2 m/s) after coating the adhesive but before sticking.

A film was thereby obtained for which the absolute values Re(450), Re(550) and Re(650) of the retardation (Re) at 450 nm, 550 nm and 650 nm were Re(450)=121.3 nm, Re(550)=149.8 nm and Re(650)=169.7 nm, respectively, and having wide band λ/4 wave plate characteristics.

The retardation (Re) of each sample at Re(450), Re(550), Re(650) and Re(750), and the value of Re(450)/Re(550), are shown in Table 1, respectively.

Example 7

A laminated film was manufactured as follows using the stretching/sticking apparatus 10 shown in FIG. 2.

First, a non-stretched polystyrene (thickness: 100 μm) was machine direction-stretched at a draw ratio of 2.0 and an stretching temperature of 110° C. so as to obtain a film of thickness 64 μm. The retardation (Re(550)) at a wavelength of 550 nm was 339.9 nm.

Simultaneously, a norbornene film (Nippon Zeon Co., Ltd., ZEONOR: thickness: 100 μm) was transported in the same direction, and machine direction-stretched at a draw ratio of 2.2 and an stretching temperature of 130° C. so as to obtain a film of thickness 60 μm. The retardation (Re(550)) at a wavelength of 550 nm was 477.1 nm.

Next, the two kinds of film were stuck together using an adhesive (Dainippon Ink & Chemicals Inc., DICDRY, 5 g/m²) in the longitudinal direction (film transport direction) by the dry lamination method, and a laminated film having a thickness of 128 μm was thus obtained.

The drying means was the application of warm air (50° C., 0.2 m/s) after coating the adhesive but before sticking.

A film was thereby obtained for which the absolute values Re(450), Re(550) and Re(650) of the retardation (Re) at 450 nm, 550 nm and 650 nm were Re(450)=121.3 nm, Re(550)=142.6 nm and Re(650)=154.2 nm, respectively, and having wide band λ/4 wave plate characteristics.

The retardation (Re) of each sample at Re(450), Re(550), Re(650) and Re(750), and the value of Re(450)/Re(550), are shown in Table 1, respectively.

Example 8

A laminated film was manufactured as follows using the stretching/sticking apparatus 10 shown in FIG. 2.

First, a non-stretched polystyrene (thickness: 100 μm) was transverse direction-stretched at a draw ratio of 2.1 and an stretching temperature of 110° C. so as to obtain a film of thickness 49 μm. The retardation (Re(550)) at a wavelength of 550 nm was 305.9 nm.

Simultaneously, a norbornene film (Nippon Zeon Co., Ltd., ZEONOR: thickness: 100 μm) was transported in the same direction, and transverse direction-stretched (tenter stretched) at a draw ratio of 2.2 and an stretching temperature of 130° C. so as to obtain a film of thickness 45 μm. The retardation (Re(550)) at a wavelength of 550 nm was 457.1 nm.

Next, the two kinds of film were stuck together using an adhesive (Dainippon Ink & Chemicals Inc., DICDRY, 5 g/m²) in the longitudinal direction (film transport direction) by the dry lamination method, and a laminated film having a thickness of 98 μm was thus obtained.

The drying means was the application of warm air (50° C., 0.2 m/s) after coating the adhesive but before sticking.

A film was thereby obtained for which the absolute values Re(450), Re(550) and Re(650) of the retardation (Re) at 450 nm, 550 nm and 650 nm were Re(450)=133.3 nm, Re(550)=149.8 nm and Re(650)=165.2 nm, respectively, and having wide band λ/4 wave plate characteristics.

The retardation (Re) of each sample at Re(450), Re(550), Re(650) and Re(750), and the value of Re(450)/Re(550), are shown in Table 1, respectively.

TABLE 1

| Examples/ Comparative Examples | Sample | Measurement wavelength (nm) | | | | Re(450)/ Re(550) |
|---|---|---|---|---|---|---|
| | | 450 nm | 550 nm | 650 nm | 750 nm | |
| | λ/4 ideal value | 112.5 | 137.5 | 162.5 | 187.3 | 0.818 |
| Example 1 | Polycarbonate (92 μm) | 362.2 | 341.6 | 328.5 | 320.4 | 1.066 |
| | Norbornene | 481.1 | 477.1 | 476.8 | 475.0 | 1.008 |
| | Laminate | 122.8 | 145.7 | 160.1 | 166.5 | 0.823 |
| Comp. Ex. 1 | Polycarbonate (92 μm) | 337.2 | 316.4 | 301.7 | 295.4 | 1.066 |
| | Norbornene | 481.1 | 477.1 | 476.8 | 475.0 | 1.008 |
| | Laminate | 817.1 | 792.3 | 777.1 | 770.2 | 1.027 |
| Example 2 | Polycarbonate (92 μm) | 337.2 | 316.4 | 301.7 | 295.4 | 1.066 |
| | Norbornene | 461.1 | 457.1 | 456.8 | 455.0 | 1.009 |
| | Laminate | 121.1 | 147.0 | 160.3 | 167.7 | 0.823 |
| Comp. Ex. 2 | Polycarbonate (92 μm) | 362.2 | 341.6 | 328.5 | 320.4 | 1.066 |
| | Norbornene | 461.1 | 457.1 | 456.8 | 455.0 | 1.009 |
| | Laminate | 823.1 | 798.3 | 784.4 | 775.7 | 1.030 |
| Example 3 | Norbornene | 461.1 | 457.1 | 456.8 | 455.0 | 1.009 |
| | Polyethylene terephthalate (40 μm) | 336.8 | 303.9 | 287.9 | 277.4 | 1.102 |
| | Laminate | 124.4 | 154.1 | 165.1 | 178.4 | 0.807 |
| Comp. Ex. 3 | Norbornene | 461.1 | 457.1 | 456.8 | 455.0 | 1.009 |
| | Norbornene | 316.4 | 316.3 | 316.6 | 316.7 | 1.000 |
| | Laminate | 143.9 | 141.7 | 140.8 | 139.8 | 1.016 |

TABLE 1-continued

| Examples/ Comparative Examples | Sample | \multicolumn{5}{c}{Measurement wavelength (nm)} |
|---|---|---|---|---|---|---|
| | | 450 nm | 550 nm | 650 nm | 750 nm | Re(450)/ Re(550) |
| Example 4 | Polyethylene terephthalate | 340.8 | 309.2 | 293.1 | 282.2 | 1.102 |
| | Norbornene | 461.1 | 457.1 | 456.8 | 455.0 | 1.009 |
| | Laminate | 120.3 | 148.3 | 162.8 | 173.4 | 0.809 |
| Example 5 | Polycarbonate | 675.1 | 634.1 | 602.9 | 590.3 | 1.065 |
| | Norbornene | 922.4 | 915.4 | 913.3 | 909.9 | 1.008 |
| | Laminate | 246.1 | 280.8 | 311.9 | 320.8 | 0.876 |
| Example 6 | Polystyrene | 481.3 | 453.2 | 430.8 | 411.3 | 1.062 |
| | Polymethylene acrylate | 603.5 | 602.8 | 600.8 | 599.3 | 1.001 |
| | Laminate | 121.3 | 149.8 | 169.7 | 181.3 | 0.810 |
| Example 7 | Polystyrene | 360.9 | 339.9 | 323.1 | 308.4 | 1.062 |
| | Norbornene | 481.1 | 477.1 | 476.8 | 475.0 | 1.008 |
| | Laminate | 121.3 | 142.6 | 154.2 | 166.3 | 0.787 |
| Example 8 | Polystyrene | 324.8 | 305.9 | 290.7 | 277.2 | 1.062 |
| | Norbornene | 461.1 | 457.1 | 456.8 | 455.0 | 1.009 |
| | Laminate | 133.3 | 149.8 | 165.2 | 175.8 | 0.889 |

Example 9

Circularly Polarizing Plate

The film obtained in Example 1 was used as a retardation plate. The retardation plate and a polarizing plate were adhered together so that a slow axis of the retardation plate and a transmission axis of the polarizing plate form an angle of 45° and thus an adhered plate was made. Then, the wavelength dispersion of Re values of this adhered plate was measured using a retardation measurement system (Oji Scientific Instruments, KOBRA21DH).

According to the results, Re/wavelength values of the adhered plate were about 0.25 throughout the entire visible light region, and the adhered plate was a circularly polarizing plate showing ¼ wavelength retarding property in a wide range. In addition, the adhered plate exhibited substantially the same Re values at the center and near the edge, and no whitening was observed at the edge.

Example 10

Reflective Liquid Crystal Display

A Game Boy Color (Nintendo) video game was disassembled and a polarizing plate and a retardation plate mounted on the side facing the observer were replaced with the circular polarizing plate of Example 9. Thus a reflective liquid crystal display (reflective LCD) was prepared.

The reflective LCD was able to display a sharp white image, which was uniform and sharp at the entire region of the display, from the center to the edge.

The present invention, which resolves the problems inherent in the prior art, provides a wide band retardation plate which can be manufactured efficiently and continuously at low cost by a simple process. As continuous winding is possible, storage is also simple and easy. The plate imparts uniform phase difference characteristics to incident light over the whole visible wavelength spectrum. In particular, it provides a wide band ¼ wave plate, wide band ½ wave plate and wide band circularly polarizing plate, and a reflective liquid crystal display having improved brightness using this retardation plate.

The present invention further provides a method of manufacturing a wide band retardation plate which imparts uniform phase difference characteristics to incident light over the whole visible wavelength region efficiently, continuously and at low cost by a simple process. As the method permits selection of raw materials regardless of whether they have a positive or negative intrinsic double refraction value, the retardation plate can be manufactured with a large selectivity of raw materials.

What is claimed is:

1. A method of manufacturing a retardation plate comprising the steps of:
   transporting and stretching in an identical direction to the transport direction a Material A to form a machine direction-stretched film,
   transporting and stretching in a perpendicular direction to the transport direction a Material B to form a transverse direction-stretched film, wherein the stretching in the identical direction to the transport direction of the Material A is simultaneous to the stretching in the perpendicular direction to the transport direction of the Material B, and
   laminating the machine direction-stretched film and the transverse direction-stretched film,
   wherein the Material A and B have different positive intrinsic double refraction values, and the retardation plate comprises:
   a laminate of at least the machine direction-stretched film and the transverse direction-stretched film having different intrinsic double refraction values, wherein the retardation plate satisfies the relation:

$Re(450) < Re(550) < Re(650)$, where $Re(450)$, $Re(550)$ and $Re(650)$ are retardation values in wavelengths 450 nm, 550 nm and 650 nm, respectively.

2. A method of manufacturing a retardation plate according to claim 1,
   wherein the step of laminating is one of (1) a lamination step performed by transporting stretched films together in an identical direction, (2) a lamination step performed by sticking wherein the slow axes in the stretched films are arranged to be perpendicular, and (3) a lamination step performed by sticking using an adhesive.

3. A method of manufacturing a retardation plate according to claim 1,
   wherein the step of forming the machine direction-stretched film, the step of forming the transverse direction-stretched film, and the step of laminating, are performed continuously.

4. A method of manufacturing a retardation plate according to claim 1, wherein the laminating of the machine direction-stretched film and the transverse direction-stretched film comprises laminating such that the machine direction-stretched film and the transverse direction-stretched film are in contact with each other.

5. A method of manufacturing a retardation plate comprising the steps of:
   transporting and stretching in an identical direction to the transport direction a Material C to form a machine direction-stretched film,
   transporting and stretching in a perpendicular direction to the transport direction a Material D to form a transverse direction-stretched film, wherein the stretching in the identical direction to the transport direction of the Material C is simultaneous to the stretching in the perpendicular direction to the transport direction of the Material D, and laminating the machine direction-stretched film and the transverse direction-stretched film, wherein the Material C and D have different negative intrinsic double refraction values, and the retardation plate comprises:

a laminate of at least the machine direction-stretched film and the transverse direction-stretched film having different intrinsic double refraction values, wherein the retardation plate satisfies the relation:

$Re(450)<Re(550)<Re(650)$, where Re(450), Re(550) and Re(650) are retardation values in wavelengths 450 nm, 550 nm and 650 nm, respectively.

6. A method of manufacturing a retardation plate according to claim 5, wherein the step of laminating is one of (1) a lamination step performed by transporting stretched films together in an identical direction, (2) a lamination step performed by sticking wherein the slow axes in the stretched films are arranged to be perpendicular, and (3) a lamination step performed by sticking using an adhesive.

7. A method of manufacturing a retardation plate according to claim 5, wherein the step of forming the machine direction-stretched film, the step of forming the transverse direction-stretched film, and the step of laminating, are performed continuously.

8. A method of manufacturing a retardation plate according to claim 5, wherein the laminating of the machine direction-stretched film and the transverse direction-stretched film comprises laminating such that the machine direction-stretched film and the transverse direction-stretched film are in contact with each other.

* * * * *